No. 752,528. PATENTED FEB. 16, 1904.
M. W. DAY.
PROTECTIVE MEANS FOR ELECTRIC BOOSTERS.
APPLICATION FILED JULY 6, 1903.
NO MODEL.

WITNESSES:
Rob't C. Chapman
Helen Orford

INVENTOR,
Maxwell W. Day,
by Albert G. Davis
Atty.

No. 752,528. Patented February 16, 1904.

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

PROTECTIVE MEANS FOR ELECTRIC BOOSTERS.

SPECIFICATION forming part of Letters Patent No. 752,528, dated February 16, 1904.

Application filed July 6, 1903. Serial No. 164,308. (No model.)

*To all whom it may concern:*

Be it known that I, MAXWELL W. DAY, a citizen of the United States, residing at Schenectady, in the county of Schenectady, State of New York, have invented certain new and useful Improvements in Protective Means for an Electric Booster, of which the following is a specification.

In operating constant-potential systems it is frequently desirable to raise the potential on particular feeders either to compensate for an excessive drop due to the length of the feeder or for greater than normal drop due to temporary or periodical increase of load. For this purpose devices commonly known as "boosters" are used by which the electromotive force may be raised on the desired feeder, so that the potential of the main generator need not be raised above a point which is sufficient for the main bus-bars which supply the system. My invention relates to a system of this kind in which the boosters are driven by electric motors supplied from the distributing bus-bars. In such an organization if by reason of an overload or any other cause the fuse or automatic circuit-breaker controlling the motor-circuit be blown the booster, being connected with the bus-bars through the feeder, will operate as a series motor, rapidly accelerating in speed until it is torn apart by centrifugal force.

It is the object of my invention to prevent such a consequence.

I provide for automatically disconnecting the booster from circuit when the motor is cut out.

The invention may be carried out in a variety of ways. One which I prefer consists in placing an automatic circuit-breaker in the main circuit between the generator and the booster, with its tripping-coil in the armature-circuit of the motor. If then the motor becomes overloaded beyond the point for which the tripping-coil is set, the circuit-breaker will open the main circuit, and thus cut out not only the motor, but the booster as well.

Figure 1:
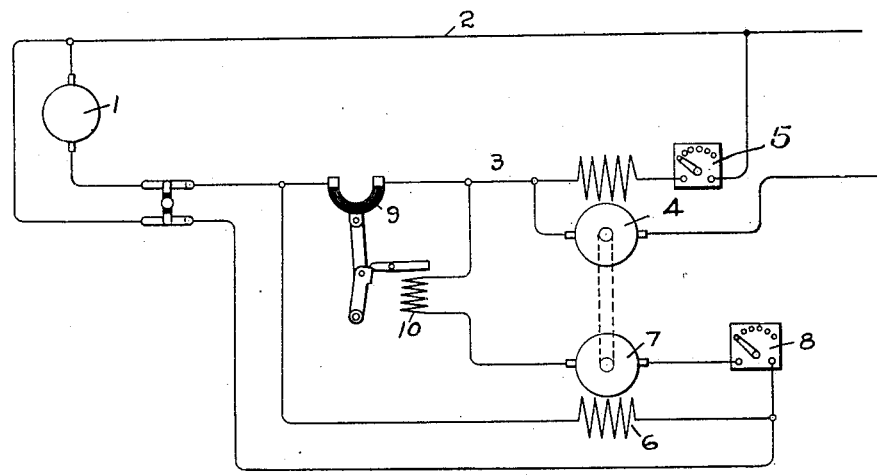
Figure 2:
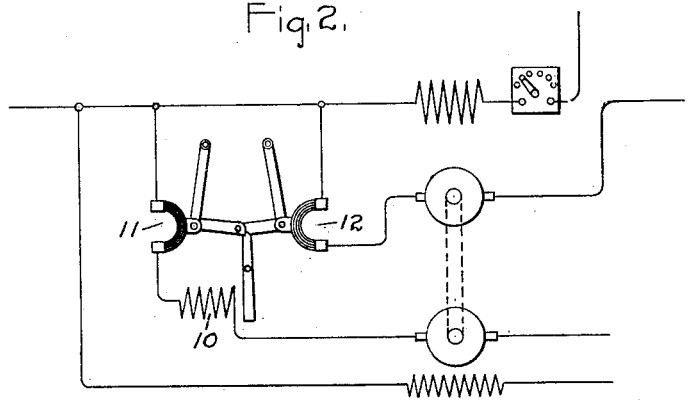

In the accompanying drawings, Figure 1 is a diagram of circuits and apparatus embodying my invention. Fig. 2 shows a modification.

The main generator 1 supplies the mains 2 3, to which is connected the booster 4. This may be series wound, if desired; but I have shown a machine having its field-coil connected across the mains and a rheostat 5 in its field-circuit, so that the strength of the field can be varied to regulate the boosting effect. With such a machine if the rheostat is adjusted to give a weak field there is the same liability to run away as with a series-wound booster. The motor for driving the booster has its field-coil 6 and armature 7 connected in parallel across the mains 2 3. A starting-rheostat 8 is shown in the armature-circuit.

In the main 3 between the generator on the one side and the booster and the motor-armature-circuit on the other I interpose a circuit-breaker 9, whose tripping-coil 10 is in series with the motor-armature. If the motor becomes overloaded, the tripping-coil 10, which will be adjusted to respond to such an overload, will open the main circuit, thus protecting the motor from injury and also preventing the booster from racing.

Instead of a single-pole circuit-breaker I may use a double-pole circuit-breaker, as shown in Fig. 2, having its tripping-coil 10 and one set of contacts 11 in the circuit of the motor and the other set of contacts 12 in the circuit of the booster, so that when the tripping-coil is energized the breaker will open the two circuits simultaneously. I prefer, however, the arrangement shown in Fig. 1 as being simpler and in my opinion more reliable.

In accordance with the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination with a booster and its driving-motor, of a circuit-breaker controlling both of them, and having its tripping-coil in the motor-circuit.

2. The combination with a booster and its driving-motor, of a circuit-breaker located in the main supplying both of them, and having its tripping-coil in the motor-circuit only.

3. The combination with a booster, of a shunt-motor for driving it, and a circuit-breaker in the main supplying both of them, having its tripping-coil in the armature-circuit of the motor.

4. The combination with a generator and supply-mains fed thereby, of a booster connected to one of said mains, a shunt-motor connected across the mains for driving said booster, and a circuit-breaker between the generator and said booster and motor, having its tripping-coil in the armature-circuit of the motor.

In witness whereof I have hereunto set my hand this 27th day of June, 1903.

MAXWELL W. DAY.

Witnesses:
LUCY PATTERSON,
EDWARD WILLIAMS, Jr.